Patented Nov. 17, 1931

1,832,416

UNITED STATES PATENT OFFICE

WILLIAM J. O'BRIEN, OF BALTIMORE, MARYLAND, ASSIGNOR TO THE GLIDDEN COMPANY, OF CLEVELAND, OHIO, A CORPORATION OF OHIO

PIGMENT

No Drawing. Application filed May 28, 1927. Serial No. 195,148.

This invention relates to pigments and process of making same.

Among the objects of this invention is the formation of a pigment which will yield a smooth and fine-grained film or coating when associated with ordinary liquid vehicles and spread as a surface coating.

A further object of this invention is the coating of pigment particles with a protective colloid whereby the properties of the pigment are modified and improved so that the pigment will form a smooth, easy-working paint that is free from agglomerates. The pigments so coated tend to remain in suspension in the paint vehicle for a much longer period of time than pigments not so treated.

Other, further and more specific objects of this invention will become readily apparent to persons skilled in the art from a consideration of the following description.

In the preparation of pigments by the methods heretofore employed, the resulting powdered pigment when incorporated with a vehicle, such as linseed oil or other drying and semi-drying oil, yields a paint surface which frequently is not as smooth and fine-grained as desired, due to the existence of agglomerated particles of the pigment. This agglomeration persists to an undesirable extent despite the grinding of the pigment in oil.

I have found that by adding suitable quantities of certain organic compounds (for example, oleic acid, stearic acid, palmitic acid, and the sodium, potassium, magnesium, calcium and ammonium salts of alginic acid) to a suspension of a pigment in water the tendency for the pigment particles to agglomerate is largely diminished, and when the pigment containing these organic compounds is ground in a vehicle as a paint, the paint film produced therefrom is smoother and freer from grains or coarse particles and results in a very smooth paint job. The effects of additions of small quantities of these fatty acids to the pigment may be attributed to a change in the surface tension of the individual particles of pigment by the presence of these fatty acids so that there is no longer any tendency for these particles to collect in clusters or agglomerates. It appears that these organic compounds coat the particles of pigment, acting as protective colloids and change the surface tension of the particles so that they do not agglomerate. The quantity of protective colloid employed in my special process may vary from 0.05% to 1% depending upon the pigment and colloid employed. When employing oleic or stearic acid as a colloid with a pigment such as lithopone, colloid material equal to 0.1% of the weight of the pigment has been found very satisfactory.

A specific example of carrying out this invention is as follows: To a warm, wet, slurry of lithopone in water there is added about 0.1% oleic acid, and the mixture is thoroughly ground, whereupon it is filter-pressed to remove the water, then dried and later ground in dry form. The resulting pigment, after incorporation with a vehicle, with or without a paint thinner, will form a paint which yields a paint film having a highly desirable and very smooth surface and finish. The pigment in this paint will remain suspended longer than pigments not so treated. In this system, the oil of the paint appears to constitute the external phase, the pigment forming the internal phase and the oleic acid being the protective colloid.

The oleic acid or other suitable protective colloid material may be added either in molten state or as a solution or emulsion in water. I have found a tube mill very satisfactory in producing a thorough incorporation of pigment and protective colloid.

If desired, the oleic acid may be added to the lithopone after calcination of the latter and prior to the wet milling step in the ordinary process of manufacturing the lithopone. By this manner, the oleic acid becomes thoroughly incorporated in the lithopone, and there is a satisfactory protective colloid coating formed on the particles of the lithopone.

My new process of treating the pigments is to be clearly distinguished from the mere addition of stearic and oleic acids and certain salts of these acids to paints for the purpose of preventing settling and giving body to the paint. My process is designed for a different purpose; namely, the alteration of the properties of the pigment itself which is brought about preliminary to the grinding of the pigment in oil. Furthermore, where heretofore the oleic and stearic acids and their salts have been added to paints, from 1 to 2% of the total weight of the paint including the vehicle is necessary to accomplish the desired effect in the paint. By my process of treating the pigments a very much smaller quantity of oleic and stearic acids will produce the totally different effect in the pigment itself, for usually with oleic or stearic acid equal to 0.1% of the weight of the dry pigment I am able to cover the pigment with the requisite amount of protective colloid or deflocculating agent to yield a pigment possessing the new modified properties.

My process finds suitable application for the treatment of other pigments besides lithopone, examples of some other pigments being white lead, whiting, iron reds, titanium pigments, blanc fixe, ground barytes, etc.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claim.

I claim as my invention:

A dry pigment comprising lithopone in finely divided form and having a protective colloid coating of oleic acid upon the individual particles of the lithopone for preventing agglomeration of the lithopone particles, said oleic acid being from 0.05 to 1% of the weight of lithopone.

In testimony whereof I affix my signature.

WILLIAM J. O'BRIEN.